United States Patent [19]
Qureshi

[11] Patent Number: 5,983,299
[45] Date of Patent: Nov. 9, 1999

[54] PRIORITY REQUEST AND BYPASS BUS

[75] Inventor: Amjad Z. Qureshi, San Jose, Calif.

[73] Assignee: Samsung Electronics Co., Ltd., Seoul, Rep. of Korea

[21] Appl. No.: 08/730,915

[22] Filed: Oct. 18, 1996

[51] Int. Cl.[6] .................................................. G06F 13/18
[52] U.S. Cl. .............................. 710/107; 710/36; 710/40; 710/52
[58] Field of Search ..................... 395/287, 291, 395/292, 296, 298, 303, 305, 856–862, 872, 877, 842; 710/36–42, 52, 57, 107, 112, 111, 116, 118, 123, 125, 22

[56] References Cited

U.S. PATENT DOCUMENTS

| | | | |
|---|---|---|---|
| 4,246,637 | 1/1981 | Brown et al. ............................ | 395/882 |
| 4,980,816 | 12/1990 | Fukuzawa et al. ..................... | 711/207 |
| 5,128,931 | 7/1992 | Yamanaka et al. ....................... | 370/60 |
| 5,128,932 | 7/1992 | Li ............................................. | 370/60 |
| 5,130,985 | 7/1992 | Kondo et al. .......................... | 370/94.1 |
| 5,438,592 | 8/1995 | Boccuzzi ................................. | 375/283 |
| 5,604,738 | 2/1997 | Shibata et al. .......................... | 370/264 |
| 5,630,166 | 5/1997 | Gamache et al. ....................... | 395/287 |
| 5,680,554 | 10/1997 | Beak ....................................... | 395/287 |
| 5,812,876 | 9/1998 | Welker et al. ........................... | 395/842 |
| 5,822,553 | 10/1998 | Gifford et al. .......................... | 395/309 |

*Primary Examiner*—Glenn A. Auve
*Assistant Examiner*—Ario Etienne
*Attorney, Agent, or Firm*—Skjerven, Morrill, MacPherson, Franklin & Friel LLP; Alan H. MacPherson; David T. Miller

[57] ABSTRACT

To reduce latency for priority requests in a bus system, non-priority requests to a bus device are separated from priority requests so that the priority requests can be processed before the non-priority requests. Priority requests are transferred over a priority request bus. Standard non-priority requests are sent over a shared bus coupled to several bus devices. One of the bus devices contains a request buffer to receive non-priority requests from the shared bus and a priority buffer to receive priority requests from the priority request bus. Requests in the priority buffer are processed before requests in the request buffer. In one embodiment, a multiplexer having input ports coupled to the request buffer and the priority buffer is configured so that the multiplexer outputs priority requests if there are priority requests in the priority buffer. Some embodiments of the bus communication system incorporate a priority bypass bus which transfers priority data directly to a peripheral device coupled to the first bus device.

15 Claims, 6 Drawing Sheets

PRIORITY REQUEST AND BYPASS BUS

BACKGROUND OF THE INVENTION

1. Field of the Invention

This invention relates to bus architectures and particularly to a priority bypass bus which provides minimum latency for priority data channels.

2. Description of Related Art

A bus is a communication path between various devices of a electronic system. For example in a computer system, the central processing unit (CPU) communicates with main memory through a memory bus. Peripheral devices may also be connected to the memory bus or connected to the CPU through a separate IO bus.

Buses can be divided into two general categories: point-to-point buses and shared buses. A point-to-point bus connects only two bus devices together. A shared bus can be used by more than two bus devices. Thus the number of buses required for communication depends on whether point-to-point or shared buses are used. For example, four bus devices require six point-to-point buses to communicate with each other, but four bus devices can communicate through a single shared bus. With a shared bus architecture, all four bus devices can share a single bus.

Point-to-point buses have the advantage of lower latency, minimal bus contention, and the ability to support multiple simultaneous data transfers. However, the large number of buses used in a point-to-point bus architecture require a large amount of chip or board area.

Since only a single shared bus can support multiple bus devices, the chip or board area required to implement a shared bus architecture is much less than is required by a point-to-point bus architecture. With the increasing complexity of electronic systems, data buses have increased in width. Wide data buses preclude the use of many point-to-point buses when chip or board area is costly. Therefore, shared buses are commonly used in complex electronic systems.

A major disadvantage of the shared bus is a high bus latency, i.e., the time between a bus device requesting use of the bus and the bus device being able to use the bus. A major source of bus latency in a shared bus occurs if multiple bus devices require the bus simultaneously.

Bus latency is increased if multiple bus devices request communications with the same target bus device. In such a situation, the target bus device may queue several requests and respond to each request in turn. Therefore, the later request to the target bus device suffers a greater latency. Therefore, a bus system is desired which provides low latency but does not consume the area consumed by a point-to-point bus architecture.

SUMMARY

In accordance with the invention, methods and systems reduce latency for priority requests in a bus communication system. The bus communication system includes a shared bus and a plurality of bus devices coupled to the shared bus. A first bus device is also coupled to a second bus device by a priority request bus. The second bus device includes a request buffer to receive non-priority requests from the shared bus and a priority buffer to receive priority request from the priority request bus. The second bus device processes priority requests in the priority buffer before processing non-priority requests in the request buffer.

In some embodiments of the invention, a multiplexer has a first input port coupled to the request buffer, a second input port coupled to the priority buffer, and a select terminal coupled to the priority buffer. Specifically, for embodiments in which the priority buffer is a single register, the priority buffer contains a priority request valid bit which is coupled to the select terminal. For embodiments in which the priority buffer is a FIFO, a FIFO empty flag is coupled the select terminal.

Typically, a peripheral device is coupled to the first bus device. The peripheral device actually receives or supplies data for the priority requests. To eliminate the latency due to the latency of the shared bus, a priority bypass bus is coupled between the peripheral device and the second bus device. Data for the priority request is transferred across the priority bypass bus instead of the shared bus.

BRIEF DESCRIPTION OF THE DRAWINGS

Use of the same reference symbols in different figures indicates similar or identical items.

DETAILED DESCRIPTION

According to an aspect of this invention, a priority bypass bus reduces the latency for high priority bus requests without significantly increasing the overall latency of a shared bus system. Furthermore, a unique circuit to bypass pending requests in a bus device causes requests from the priority bypass bus to be processed prior to other pending non-priority requests within a bus device.

Figure 1:
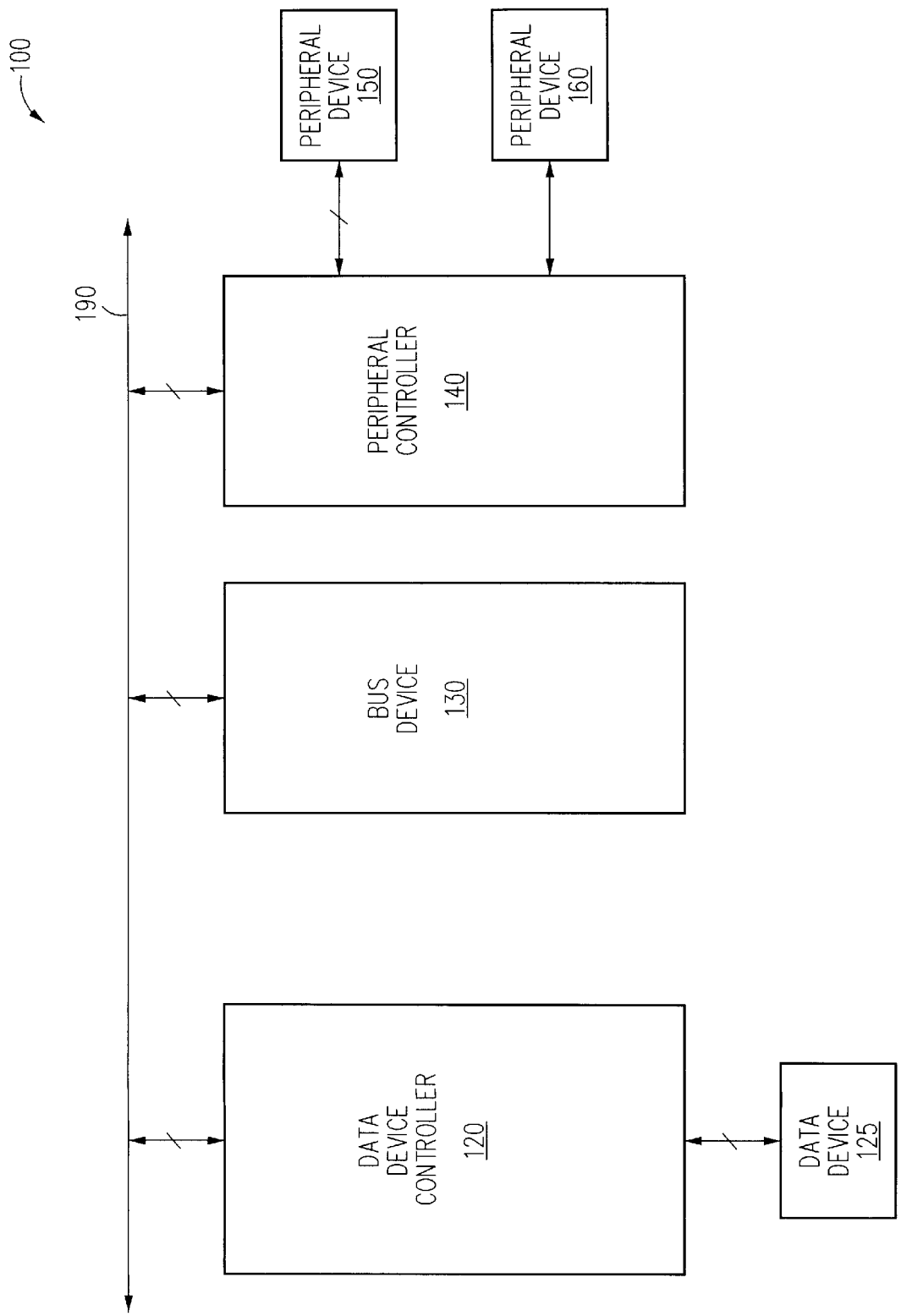
FIG. 1 shows a block diagram of a shared bus system.

FIG. 1 shows a block diagram of a conventional shared bus system 100. Various bus devices such as data device controller 120, bus device 130, peripheral controller 140, as well as other possible bus devices (not shown) are coupled together by a shared bus 190, which can contain an address bus, a data bus, and a control bus. On some shared bus systems, the address values and data values are multiplexed on a single combined address/data bus.

Data device controller 120 is coupled to a data device 125, which could be, for example, a memory system, such as synchronous dynamic memory chips, a magnetic disk drive, or a tape drive; a data gathering system, such as a camera, an audio input device, or a measurement station; or a communication device, such as a computer network. Peripheral controller 140 is coupled to a peripheral device 150, and a second peripheral device 160. Peripheral device 150 and peripheral device 160 can be for example, graphics display controllers, audio codecs, video codecs, disk drives, tape drives, or computer networks.

Shared bus system 100, typically, has a bus arbitration system to control access to shared bus 190. The specific bus arbitration scheme used is not an integral part of the invention. Methods, circuits, and techniques for bus arbitration are described in co-filed U.S. patent application Ser. No. 08/731,393 entitled "SHARED BUS SYSTEM WITH TRANSACTION AND DESTINATION ID" of Amjad Z. Qureshi and Le Trong Nguyen, with which is incorporated herein by reference in its entirety.

A bus device which is granted the use of the bus is commonly referred to as a bus master. The bus master communicates with another bus device, which is commonly referred to as the bus slave. A bus device may be capable of being a master only, a slave only, or both a master and a slave.

Depending on the actual implementation of the shared bus 190, various control signals may be beneficial. For example, if each bus device uses data FIFOs as a buffer, status flags such as FIFO full and FIFO empty can be used to indicate whether the bus slave is ready to receive or transmit data. In another bus system, a device ready signal may be used.

Shared bus 190 can experience the bus latency problem discussed above. For example, if data device 125 is the main memory for bus system 100, bus device 130 and peripheral controller 140 may access data device 125 frequently. Furthermore, other bus devices may require the use of shared bus 190 for communication with other bus devices. At some times, the latency of shared bus 190 can be quite high. Furthermore, data device controller 120, now functioning as a memory controller, may have to queue the requests for data device 125 and process them sequentially. Therefore, the latency of data device controller 120 further worsens the latency of shared bus 190 for requests on data device 125.

If peripheral device 160 is a priority device such as a display controller, which requires screen data for screen refreshes, requests from peripheral device 160 must have a low latency response. Therefore, data device controller 120 must be able to prioritize requests from peripheral device 160. Furthermore the bus arbitration scheme used for shared bus 190 must give priority to peripheral device 160.

Figure 2:
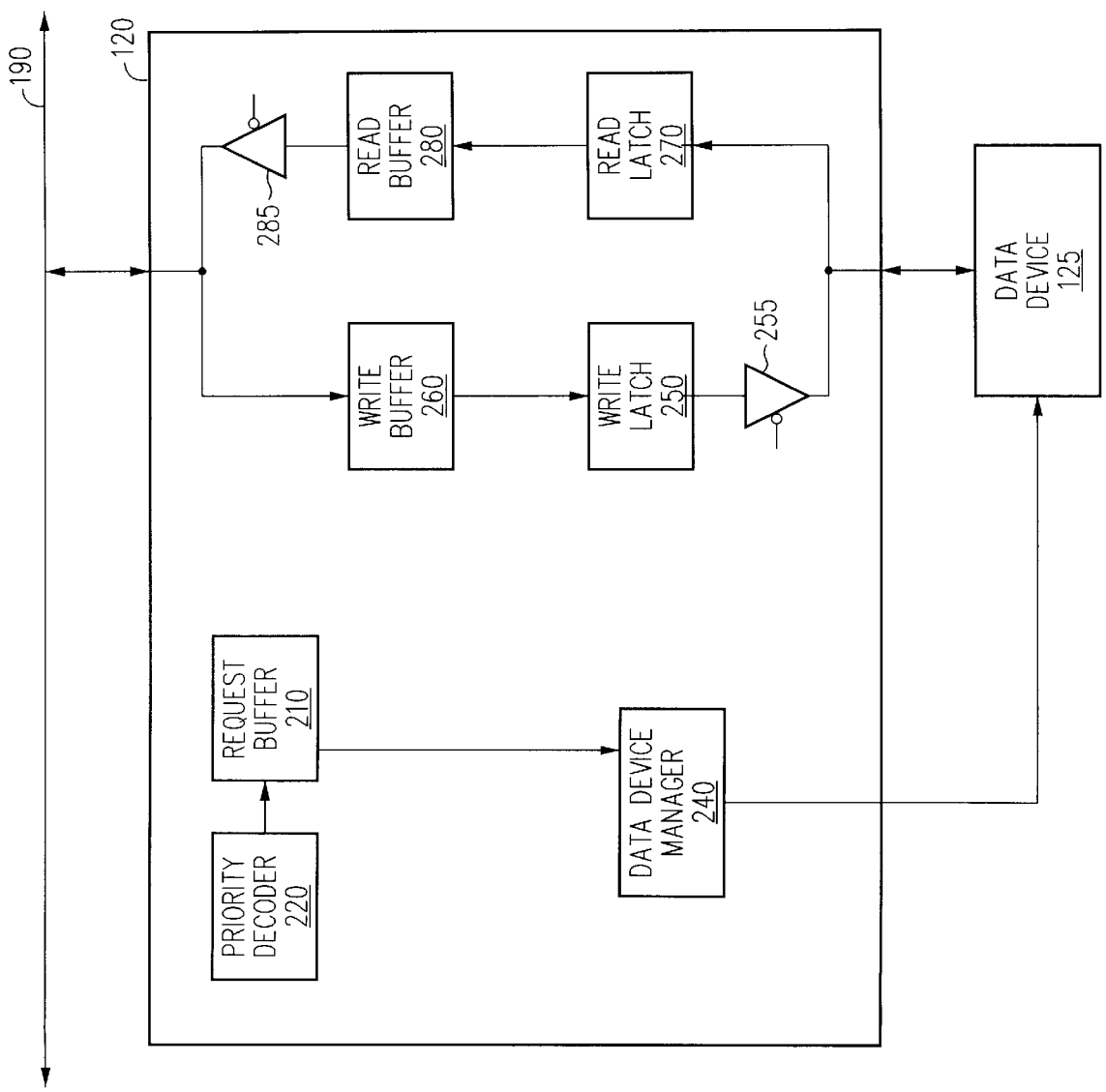
FIG. 2 shows a block diagram of a data device controller.

FIG. 2 shows a solution to reduce latency of priority requests within data device controller 120. Data device controller 120 contains a request buffer 210, which stores pending requests for data device 125. The requests contain priority information which priority decoder 220 uses to determine which of the pending requests in request buffer 210 has the greatest priority. Priority decoder 220 controls request buffer 210 to provide the pending request with the highest priority to data device manager 240. Data device manager 240 controls data device 125 to accept or provide data according to the request.

On a data write request, data from shared bus 190 is temporarily stored in write buffer 260 and write latch 250 before transfer to data device 125 through three state buffer 255. Three state buffer 255 represents a separate three state buffer on each data line coupling write latch 250 to data device 125. Three state buffer 255 is disabled during reads so that the output of write latch 250 does not interfere with the output of data device 125. Typically, write buffer 260 uses fast memory devices such as SRAM or a FIFO so that the transfer time from shared bus 190 is minimized. On a data read request, data from data device 125 passes through read latch 270 read buffer 280, and three state buffer 285 to reach shared bus 190. Three state buffer 285 is enabled only when data from read buffer 280 is sent to shared bus 190 to prevent line contention between bus devices on shared bus 190. If data device 125 is a slow device, using posted reads can reduce the impact of the latency of data device 125 on the speed of shared bus 190 since transfer to shared bus 190 can occur from read buffer 280. Some embodiments of data device 125 use separate input and output ports. With such embodiments of data device 125, three state buffer 255 is not necessary, since write latch 250 is coupled to the input port of data device 125. Similarly, read latch 270 is coupled to the output port of data device 125.

For priority decoding, request buffer 210 is a random access memory structure instead of a relatively simple design such as a FIFO. Furthermore, for priority decoding, all requests and therefore all bus devices must contain circuitry to support the priority scheme of device controller 120.

Furthermore, priority decoder 220 in data device controller 120 does not eliminate the inherent latency of shared bus 190 due to multiple simultaneous requests. A priority scheme on the arbitration of shared bus 190 to allow a high priority device to access the bus before lower priority devices reduces latency for the high priority device. However, the low priority devices may suffer an increased latency since the high priority device may repeatedly request shared bus 190 at the same time as a low priority device.

Figure 3:
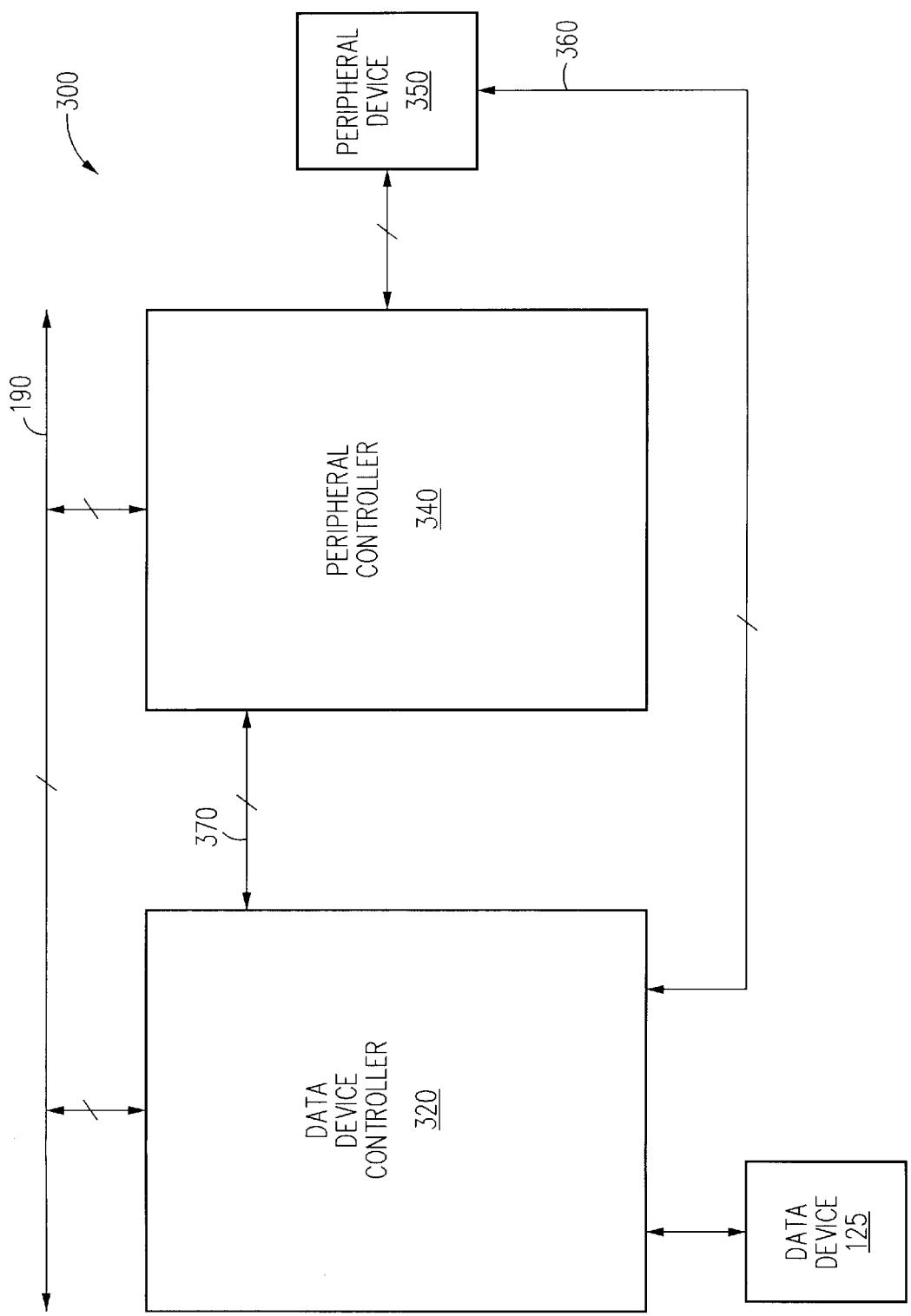
FIG. 3 shows a block diagram of a shared bus system with a priority bypass bus in accordance with an embodiment of the invention.

FIG. 3 shows a block diagram of a shared bus system 300 incorporating a priority bypass bus 360 in accordance with an embodiment of the invention. The various elements of shared bus system 300 can be, for example, manufactured on a single integrated circuit, manufactured as components on a single printed circuit board, or manufactured using multiple printed circuit boards. In shared bus system 300, various bus devices, such as data device controller 320 and peripheral controller 340, share a shared bus 190. Shared bus 190 may contain an address bus, a data bus, and a control bus. Shared bus system 300 also contains data device 125 which is coupled to and controlled by data device controller 320. In addition, peripheral device 350 is coupled to peripheral controller 340. In some embodiments peripheral device 350 is incorporated with peripheral controller 340 as a single unit. Similarly, in some embodiments data device 125 and data device controller 320 are combined as a single unit.

Peripheral device 350 makes high priority requests of data device 125. Therefore, requests to data device 125 from peripheral device 350 should be granted with very little latency. To avoid the latency of shared bus 190, peripheral device 350 is coupled directly to data device controller 320 by priority bypass bus 360. Various embodiments of priority bypass bus 360 may contain data buses, control buses, or address buses.

Peripheral controller 340 is also directly coupled to data device controller 320. In particular, peripheral controller 340 is able to send priority request signals to device controller 320 via priority request bus 370. Various embodiments of priority request bus 370 may contain data buses, control buses, or address buses. However, most embodiments of request bus 370 do not incorporate a data bus.

When peripheral device 350 requires data from data device 125, peripheral controller 340 initiates a priority bus request by driving a priority request on priority request bus 370. Typically, peripheral controller 340 first monitors a priority request enable status line on priority request bus 370 to determine whether data device controller 320 is able to handle a new priority request. If data device controller 320 is able to handle a new priority request, peripheral controller 340 drives a priority request to data device controller 320. Typically, peripheral controller 340 drives priority request information on priority request bus 370 as well as control signals to validate the priority request information. Other control signals to indicate the size of the request, whether the request is a read or a write, or the identity of the requester may also be part of the priority request information. Data device controller 320 services priority requests before pending non-priority requests from shared bus 190. When data device controller 320 services the priority request, data is transferred on priority bypass bus 360 rather than shared bus 190. Therefore, while a priority request is processed, other devices can use shared bus 190. However, some embodiments use shared bus 190 for priority data as well.

Figure 4:
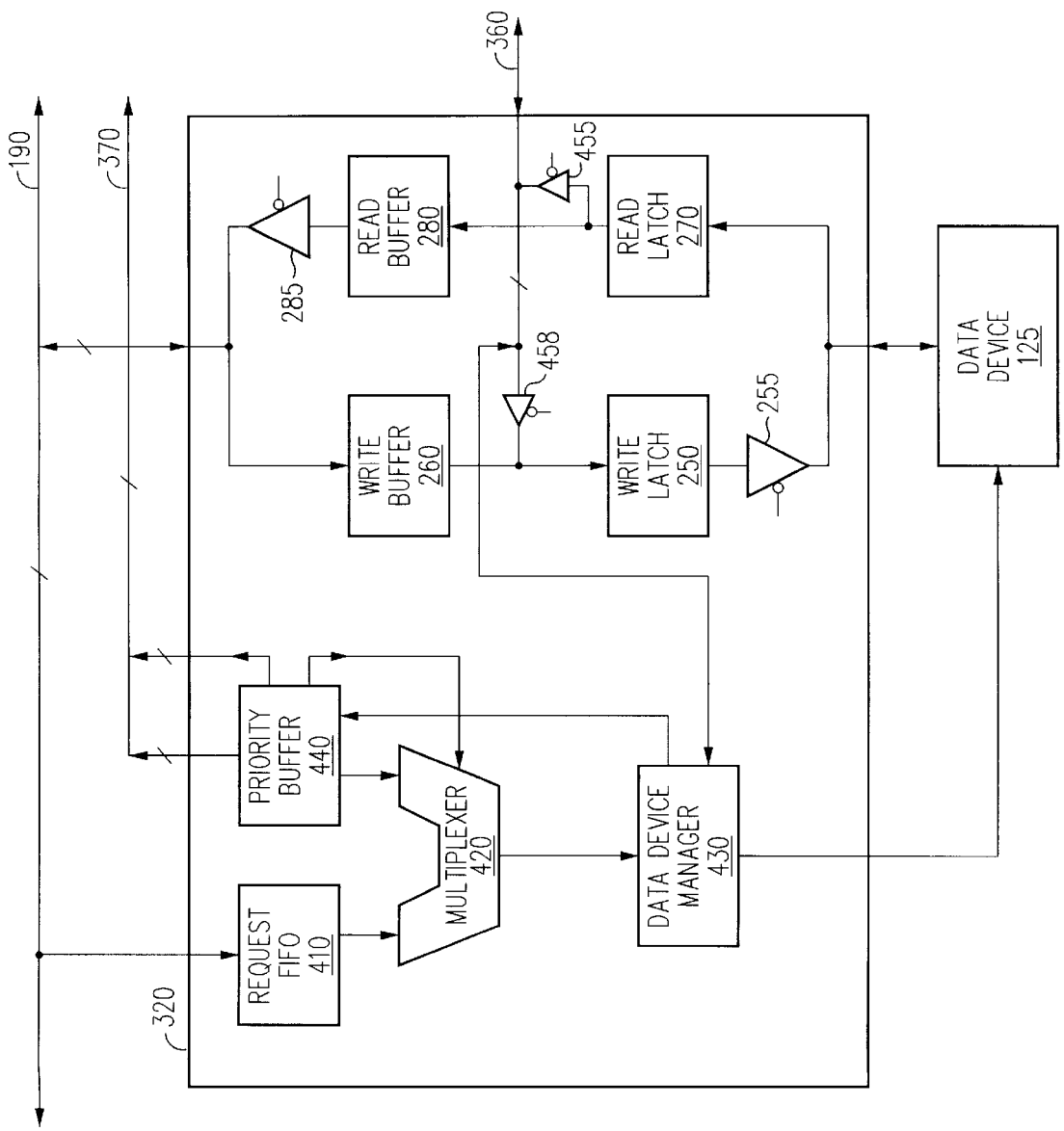
FIG. 4 shows a data device controller using a priority bypass bus in accordance with an embodiment of the invention.

FIG. 4 shows a block diagram of one embodiment of data device controller 320 which allows priority requests to be processed before other pending non-priority requests. Non-priority requests from shared bus 190 are stored in request FIFO 410. In other embodiments, memory architectures other than a FIFO are used in place of request FIFO 410. Priority requests from priority bus 370 are stored in priority buffer 440. The requests from request FIFO 410 and priority buffer 440 are respectively fed into a first input port and a second input port of multiplexer 420. If priority buffer 440 contains a valid priority request, multiplexer 420 sends a priority request from priority buffer 440 to data device manager 430. Otherwise, multiplexer 420 sends a non-priority request from request FIFO 410 to data device manager 430.

In one embodiment of data device controller 320, priority buffer 440 is a single register which stores a priority request from priority request bus 370. The priority request includes an address value for data device 125 as well as control signals, such as transfer size, requester ID, and Read/Write. In addition, a priority request valid bit in priority buffer 440 stores a priority request valid signal from a priority request valid line in priority bus 370. The priority request valid bit is coupled to the select line of multiplexer 420. If the select line of multiplexer 420 is driven by the priority request valid bit to a priority request valid state, multiplexer 430 drives the priority request in priority buffer 440 to data device manager 430. In addition, the priority request valid bit is coupled to the priority request enable status line since in this embodiment priority buffer 440 can contain only one valid priority request at a time. After, the priority request is received by data device manager 430, data device manager 430 resets priority buffer 440 and clears the priority request valid bit. Peripheral controller 340 sends priority requests to data device controller 320 only when there is not a valid priority request in priority buffer 440.

In another embodiment of data device controller 320, priority buffer 440 is a FIFO, which can store multiple pending priority requests. In this embodiment, a priority request valid signal on priority bus 370 is coupled to a write enable terminal of the FIFO. A FIFO full flag is used for the priority request enable signal to indicate whether another priority request can be sent by peripheral controller 340. In addition, a FIFO empty flag from priority buffer 440 is coupled to the select terminal of multiplexer 420. So long as priority buffer 440 is not empty, multiplexer 420 sends priority requests to data device manager 430.

The design of data device manager 430 is constrained by the particular data device being managed by data device manager 430. The portion of data device manager 430 relevant to the invention resets priority buffer 440 in the single register embodiment and drives control signals on priority bypass bus 360, if necessary. For example, in one embodiment of the invention, a priority data valid line is used on priority bypass bus 360 to indicate that data device controller 340 is driving valid data on priority bypass bus 360.

Non-priority reads and writes via shared bus 190 to data device 125 through data device controller 340 are very similar to the reads and writes through data device controller 120 as described above with respect to FIG. 2. Therefore, the description is not repeated.

For priority reads from data device 125, data device manager 430 enables three state buffer 455 so that data from read latch 270 are driven onto priority bypass bus 360. In other embodiments three state buffer 455 is coupled to the output of read buffer 280 so that data for priority bus 360 first passes through read buffer 280. For priority writes to data device 125, data device manager 430 enables three state buffer 458 so that data from priority bypass bus 360 is driven into write latch 250. In other embodiments of the invention, three state buffer 458 is coupled to the input terminals of write buffer 260 so that data from priority bypass bus 360 are driven into write buffer 260.

Some shared bus systems might only incorporate priority request bus 370 without priority bypass bus 360. In these embodiments, data device controller 320 must use shared bus 190 to transfer data for the priority request. These embodiments only remove the latency due to multiple requests on data device 125 but do not eliminate the latency of shared bus 190.

Figure 5:
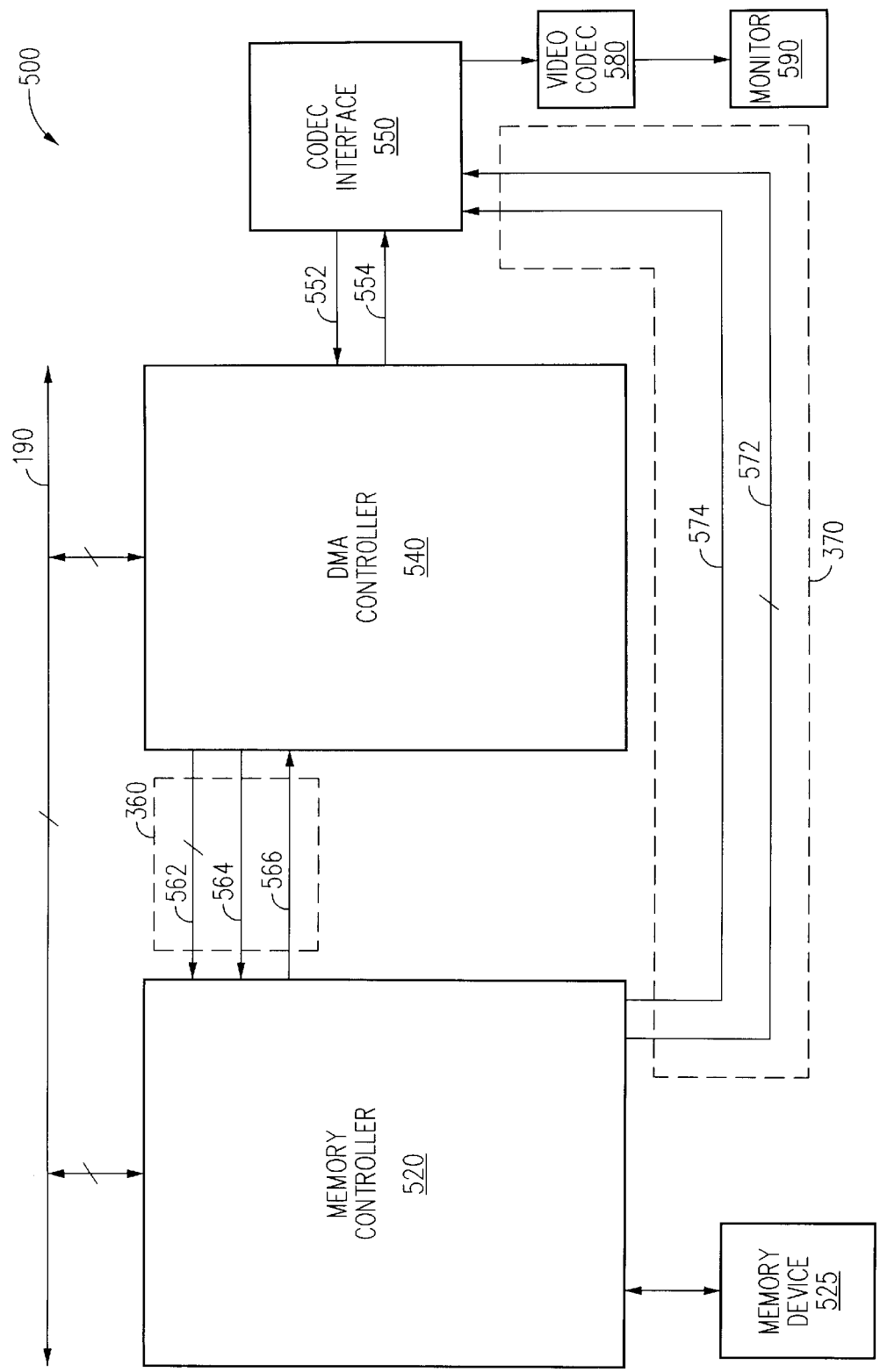
FIG. 5 shows a block diagram of a shared bus system with a priority bypass bus in accordance with an embodiment of the invention.

FIG. 5 shows a synchronous shared bus system 500, which is part of a multimedia signal processing system. Bus system 500 has an architecture similar to bus system 300 (FIG. 3). Relative to bus system 300, peripheral device 350 corresponds to a codec interface 550, peripheral controller 340 corresponds to a DMA controller 540, data device controller 320 corresponds to a memory controller 520, and data device 125 corresponds to memory device 525 which is formed from conventional memory chips. In this embodiment, the components of synchronous shared bus 500 are synchronized by a clock signal CLK (not shown) and memory device 525 is part of a unified memory architecture, using for example synchronous DRAM. In one embodiment memory device 525 is interleaved with two memory banks for increased speed. Both video screen data as well as other data are stored in memory device 525.

The embodiment of data device controller 340 shown in FIG. 4 can be used for memory controller 520. However, data device manager 430 must be able to control memory device 525.

Various DMA controllers can be used as DMA controller 540. Most DMA controllers generate the address for the various DMA requests. Some methods, circuits, and techniques for DMA controllers are described in co-filed, U.S. patent application Ser. No. 08/733,411, entitled "DMA CONTROLLER WHICH RECEIVES SIZE DATA FOR EACH DMA CHANNEL" of Amjad Z. Qureshi, et al.; co-filed U.S. patent application Ser. No. 08/733,903, entitled "SIMULTANEOUS DATA TRANSFER THROUGH READ AND WRITE BUFFERS OF A DMA CONTROLLER" of Kab Ju Moon, et al.; and co-filed U.S. patent application Ser. No. 08/730,761, entitled "DMA CONTROLLER WITH CHANNEL TAGGING" of Kab Ju Moon, et al. The subject matter of the three applications listed above is incorporated herein by reference in its entirety.

The details of codec interface 550 depends on the specific type of codec coupled to codec interface 550. However, methods, circuits, and techniques for some suitable CODEC interfaces are described in co-filed, U.S. patent application Ser. No. 08/733,905, entitled "VIDEO AND OVERLAY SYSTEM AND METHOD" of Hoyoung Kim, which is herein incorporated by reference in its entirety.

Video codec 580, which can be for example model number KS0119 CODEC from Samsung Electronics, Ltd, performs screen refreshes on monitor 590. To ensure flicker free, sharp images on monitor 590, video codec 580 must constantly refresh the image on monitor 590. The delay between each refresh cycle must be small so that no flicker occurs on monitor 590. Therefore, the latency of the refresh request on memory device 525 must be small. Consequently, requests for refresh data by codec interface 550 is a priority request.

Codec interface 550, which controls video codec 580, requests refresh data from DMA controller 540 by driving a DMA request signal DMA_REQ (FIG. 6) on DMA request line 552. When DMA controller 540 is able to make a priority request on priority request bus 360, DMA controller 540 acknowledges the DMA request from codec interface 550 by driving a DMA acknowledge signal DMA_ACK (FIG. 6) on DMA acknowledge line 554.

In synchronous shared bus system 500, priority request bus 360 comprises a priority request info bus 562, a priority request valid line 564, and a priority request enable status line 566. Priority request info bus 562 transfers information regarding the priority request such as an address, a size, and a type for the priority request. Priority request valid line 564 is driven by DMA controller 540 to indicate a valid priority request is being driven. Priority request enable status line 566 is driven by memory controller 520 to indicate memory controller 520 is able to accept a priority request.

In synchronous shared bus system 500, priority bypass bus 370 comprises a priority data bus 572 and a priority data valid line 574. Memory controller 520 drives refresh data to video codec 550 on priority data bus 572. Memory controller 520 also drives a data valid signal DATA_VALID onto priority data valid line 574 to indicate when refresh data on priority data bus 572 is valid.

Figure 6:
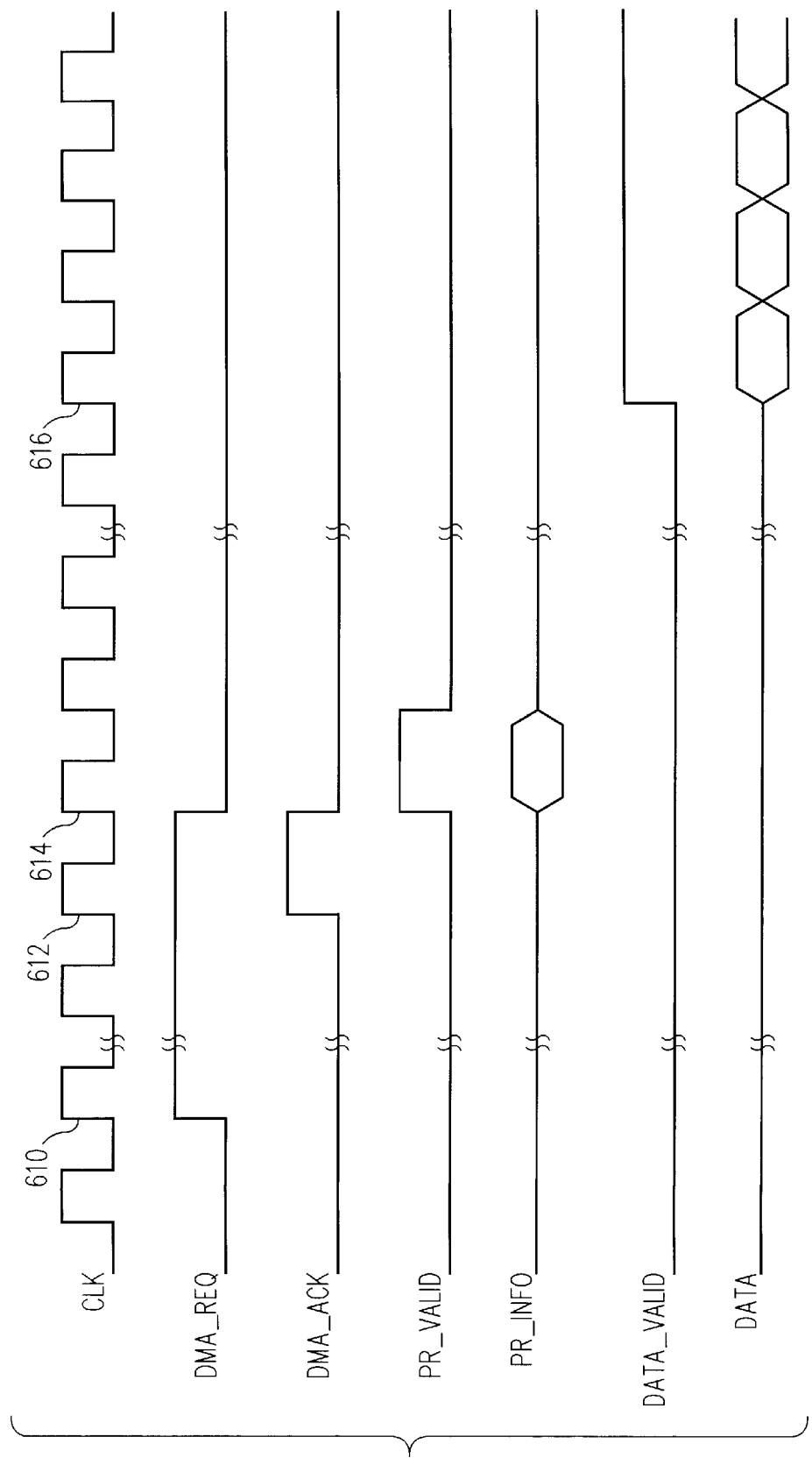
FIG. 6 shows a timing diagram for a priority read request on a priority bypass bus in accordance with an embodiment of the present invention.

FIG. 6 provides the timing diagram of a refresh cycle for one embodiment synchronous shared bus 500. In the timing diagram of FIG. 6, logic high is used as the active state on all signals. However, in various embodiments some signals may be active low signals and use logic low as the active state. On rising edge 610 of clock signal CLK, codec interface 550 begins a refresh request by driving DMA request signal DMA_REQ on DMA request line 552 to a logic high. After memory controller 520 is available to receive a priority request, DMA controller 540 drives DMA acknowledge signal DMA_ACK on DMA acknowledge line 554 to an active high at rising edge 612 of clock signal CLK.

At rising edge 614 of clock signal CLK, DMA controller 540 drives a priority request valid signal PR_VALID on priority request valid line 564 to a logic high. Also at rising edge 614, DMA controller 540 drives the priority information PR_INFO for the priority request onto priority info bus 562.

A few clock cycles later, the exact number of which depends on the latency of memory controller 520 and memory device 525, memory controller 520 drives refresh data to codec interface 550. Specifically, at rising edge 616, memory controller 520 asserts a data valid signal DATA_VALID on priority data valid line 574 and drives refresh data DATA onto priority data bus 572. Codec interface 550 provides the refresh data to video codec 580, and video codec 580 generates a video signal to refresh the screen on monitor 590.

The various embodiments of the structure of this invention that are described above are illustrative only of the principles of this invention and are not intended to limit the scope of the invention to the particular embodiments described. In view of this disclosure, those skilled-in-the-art can define within the scope of the invention other implementations of buses, control buses, latches, FIFOs, registers, buffers, bus devices, peripherals, memory controllers, data devices, data device controllers, DMA controllers, peripheral controllers, CODECs, CODEC interfaces, control lines, and use these alternative features to create a low latency bus system.

We claim:

1. A bus communication system comprising:
   a shared bus;
   a priority request bus, wherein the priority request bus comprises a priority info bus, a priority request valid line, and a priority request enable status line;
   a first bus device coupled to the shared bus and the priority request bus; and
   a second bus device coupled to the shared bus and the priority request bus, the second bus device having:
      a request buffer coupled to receive a non-priority request from the shared bus; and
      a priority buffer coupled to receive a priority request from the priority request bus.

2. The bus communication system of claim 1, wherein the priority buffer is a register having a priority request valid bit, wherein the priority request valid bit stores a priority request value from the priority request valid line.

3. The bus communication system of claim 2, wherein the priority request valid bit drives the priority request enable status line.

4. The bus communication system of claim 3, wherein the second bus device further comprises a multiplexer having a first input port coupled to the request buffer, a second input port coupled to the priority buffer, and a select terminal coupled to the priority request valid bit.

5. The bus communication system of claim 1, wherein the priority buffer is a FIFO having a write enable terminal coupled to the priority request valid line.

6. The bus communication system of claim 5, wherein the FIFO has a FIFO full flag coupled to the priority request enable status line.

7. The bus communication system of claim 5,
   wherein the second bus device further comprises a multiplexer having a first input port coupled to the request buffer, a second input port coupled to the priority buffer, and a select terminal; and
   wherein the FIFO has a FIFO empty flag coupled to the select terminal of the multiplexer.

8. A bus communication system comprising:
   a shared bus;
   a bypass bus;
   a plurality of bus devices coupled to transfer data and communicate with each other via the shared bus, wherein the plurality of bus devices includes a memory controller and a DMA controller; and
   an I/O system coupled to the DMA controller for data transfers via the shared bus, the I/O system being coupled to the memory controller for priority data transfers via the bypass bus, wherein the memory controller comprises:
      a buffer circuit that records requests for data transfers via the shared bus and priority data transfers via the bypass bus; and
      a data device manager that gives priority to priority data transfers so that the memory controller performs a priority data transfer before performing other requests recorded in the buffer circuit.

9. The bus communication system of claim 8, wherein the I/O system comprises a codec interface.

10. The bus communication system of claim 9, wherein the I/O system further comprises a video codec, and the priority data transfer comprises video data.

11. The bus communication system of claim 8, further comprising a priority request bus connected to carry requests for priority data transfers between the I/O system and the memory controller.

12. The bus communication system of claim 11, wherein the buffer circuit in the memory controller comprises:

a request buffer coupled to receive a non-priority request from the shared bus; and a priority buffer coupled to receive a priority request from the priority request bus.

13. The bus communication system of claim 11, wherein the plurality of bus devices further comprises a third bus device coupled to the shared bus, wherein the third bus device is not coupled to the priority request bus.

14. The bus communication system of claim 12, wherein the priority request in the priority buffer is processed before the non-priority request in the request buffer.

15. The bus communication system of claim 12, wherein the request buffer is a FIFO capable of storing a plurality of non-priority bus requests.

* * * * *